United States Patent [19]

Chen

[11] Patent Number: 5,730,406
[45] Date of Patent: Mar. 24, 1998

[54] ADJUSTING DEVICE FOR A DISPLAY PANEL

[76] Inventor: Ping Chen, No. 29, Nanmei St., Nantun Li, Nantun Dist., Taichung, Taiwan

[21] Appl. No.: 714,253

[22] Filed: Sep. 17, 1996

[51] Int. Cl.$^6$ ................................................. F16M 13/00
[52] U.S. Cl. ........................ 248/223.41; 248/222.11; 248/221.11; 248/291.1; 248/923; 403/87
[58] Field of Search ............... 248/291.1, 222.11, 248/223.41, 221.11, 917, 919, 923, 922; 403/84, 87, 110, 329

[56] References Cited

U.S. PATENT DOCUMENTS

| 2,476,134 | 7/1949 | Care ........................ 248/223.41 X |
| 4,524,940 | 6/1985 | Yurchenco et al. .......... 248/923 X |
| 4,714,223 | 12/1987 | Kamaya ...................... 403/87 X |
| 4,790,504 | 12/1988 | Wills et al. ................ 248/923 X |
| 5,016,851 | 5/1991 | Koskinen et al. ............ 403/87 X |
| 5,100,098 | 3/1992 | Hawkins ..................... 248/291.1 |
| 5,108,062 | 4/1992 | Detwiller ................... 403/84 X |
| 5,329,289 | 7/1994 | Sakamoto et al. ............ 248/922 X |
| 5,332,183 | 7/1994 | Kagayama .................... 248/223.41 X |
| 5,431,544 | 7/1995 | Hsu et al. .................. 248/676 X |
| 5,470,040 | 11/1995 | Bhagat et al. .............. 248/222.11 |
| 5,629,833 | 5/1997 | Ido et al. .................. 248/922 X |

FOREIGN PATENT DOCUMENTS 1016563  1/1966  United Kingdom ............ 248/223.41

*Primary Examiner*—Peter M. Cuomo
*Assistant Examiner*—Hanh V. Tran
*Attorney, Agent, or Firm*—Bacon & Thomas

[57] ABSTRACT

An adjusting device for a display panel includes a base member connected to the display panel, the base member having two receiving passages defined therein, a connecting member having two flanges for inserting into the receiving passages and a top board which has a transverse slot for an engagement with a protrusion extending from a flexible plate integrally extending from the base member, the connecting member having a first half tube transversely disposed to a lower end thereof, a second half tube connected to the first half tube and fixedly connected to the connecting member, each of the first half tube and the second half tube having a plurality of ribs extending radially and inwardly from an inner periphery thereof so as to receive a frame of an exercise machine therein and the display panel can be rotated about an axis of the frame.

7 Claims, 5 Drawing Sheets 5,730,406

ADJUSTING DEVICE FOR A DISPLAY PANEL

BACKGROUND OF THE INVENTION

1. Field of the Invention

The present invention relates to an adjusting device and more particularly, to an angle adjusting device for a display panel disposed to an exercise machine.

2. Brief Description of the Prior Art

Some exercise machines, such as running exercise machines, are equipped with a display panel for reference of users. The display panel is fixedly connected to a frame of the exerciser as shown in FIG. 1 wherein the a display panel 70 is fixedly disposed to a support board 71 disposed to a distal end of the frame 72 by bolts 73 such that a user can get information about running speed heart rate etc when using the exercise machine. However, although an angle of the display panel 70 corresponds to an longitudinal axis of the frame, is suitable for most of users, it is fixed such that the display panel cannot be adjusted according to the needs of some users who may be very short or tall.

The present invention intends to provide an adjusting device for a display panel so as to allow the display panel to be rotated to a desired angle suitable for a user so as to mitigate and/or obviate the above-mentioned problems.

SUMMARY OF THE INVENTION

The present invention provides an adjusting device for a display panel and includes a base member connected to a rear side of the display panel and which has two side skirts each extending from each one of two sides thereof so as to define a receiving passage between each of the side skirts and the base member. A connecting member has a roof which has two side walls separately extending therefrom and two rear walls each connected to the roof and the side wall corresponding thereto so as to define a recess between the two rear walls. Each of the side walls has a flange extending laterally therefrom for insertion into the receiving passage corresponding thereto and a top board extending from a top of the roof for connecting to the base member. The roof has a notch defined in an inner surface thereof and the two side walls have a first half tube transversely formed on a respective lower end thereof. The first half tube has a first engaging portion formed on a lower edge thereof.

A second half tube has an upper part formed on an upper edge thereof and a second engaging portion formed on a lower edge thereof for engagement with the first engaging portion. The upper part comprises an extending plate extending inclinedly from the upper edge of the second half tube and two side parts extending from the upper edge of the half tube. The extending plate has a hook formed thereto so as to engage with the notch and each of the side parts are fixedly connected to the rear wall corresponding thereto by bolts. A frame of an exerciser is received between the first and the second half tube such that the display panel is allowed to be rotated about an axis of the frame.

It is an object of the present invention to provide an adjusting device which connects the display panel to a frame of an exercise machine so as to allow the display panel to be rotated about an axis of the frame.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
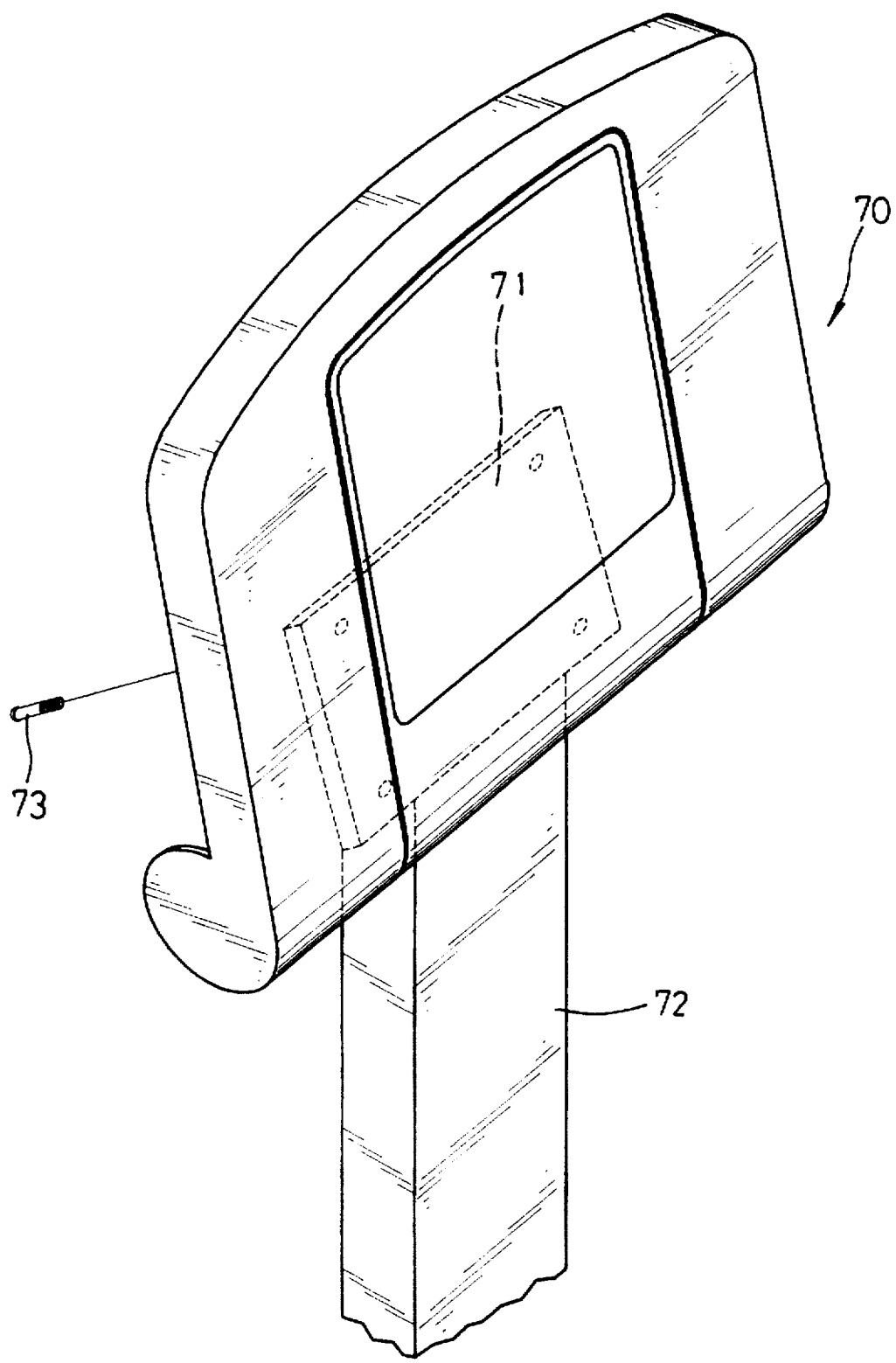
FIG. 1 is a perspective view of a conventional display panel fixedly disposed to a frame of an exerciser.
Figure 2:
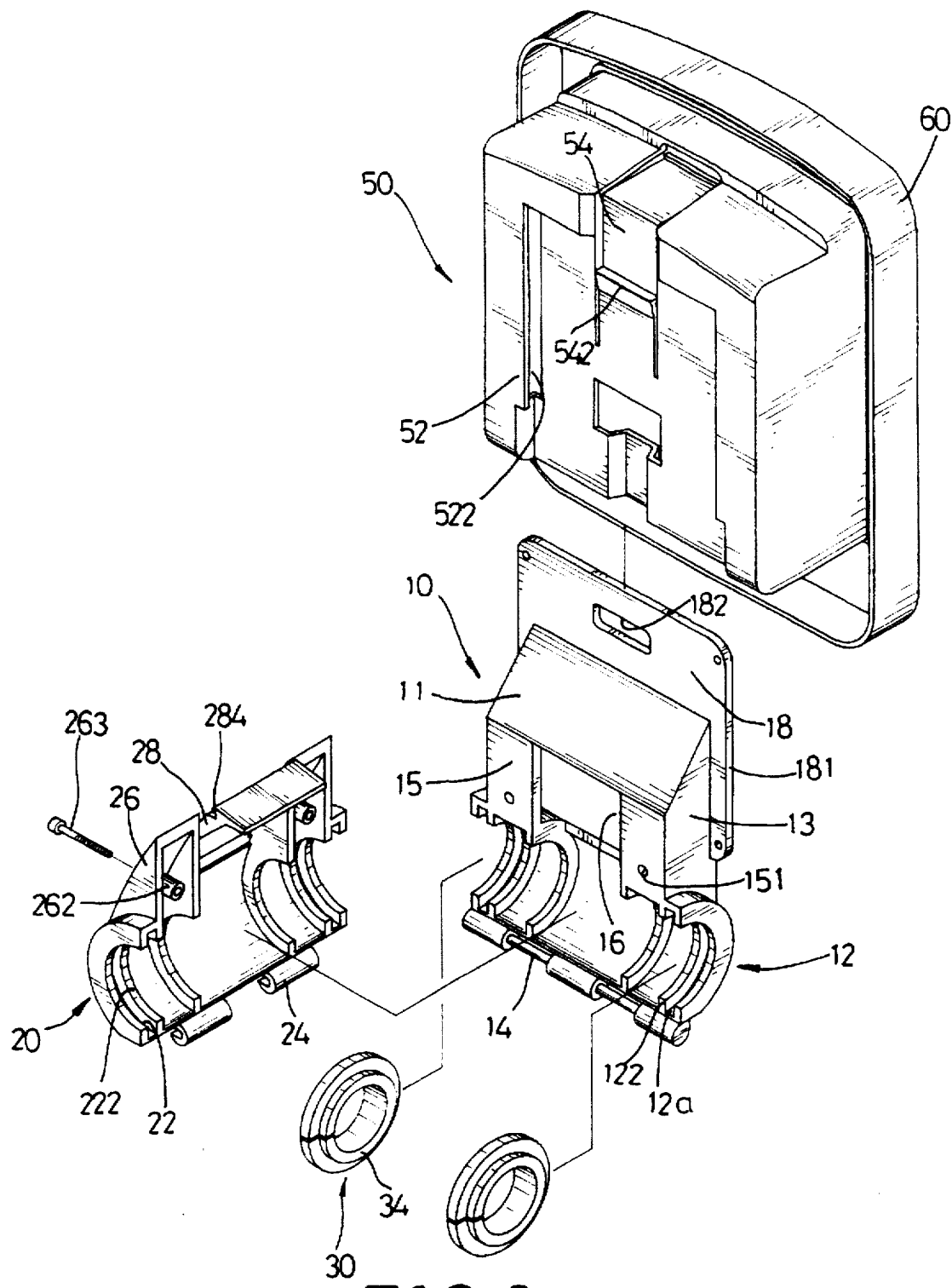
FIG. 2 is an exploded view of an adjusting device in accordance with the present invention.
Figure 3:
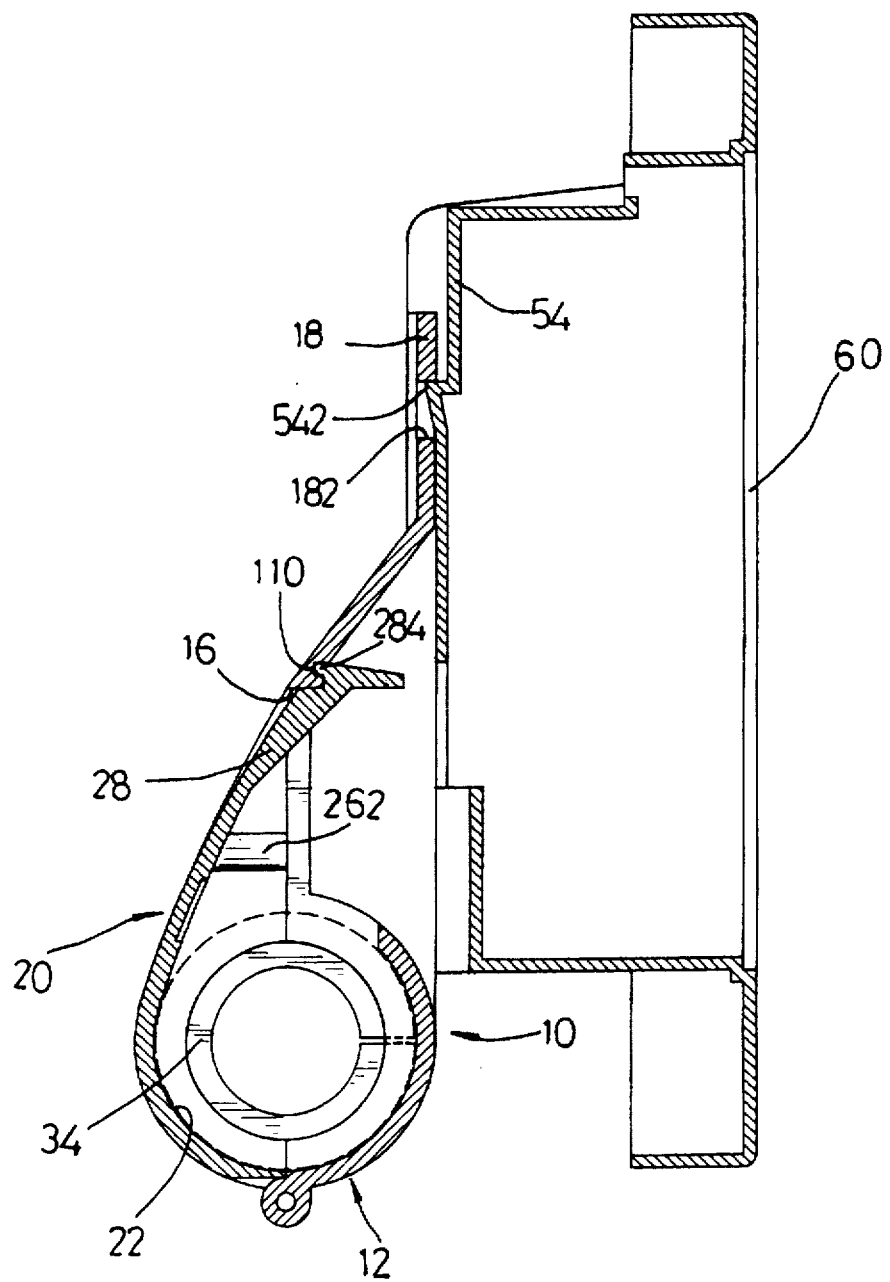
FIG. 3 is a side elevational view, partly in section, of the adjusting device in accordance with the present invention.

Referring to the drawings and initially to FIGS. 2 and 3, an adjusting device in accordance with the present invention generally includes a box-shaped base member 50 which is connected to a rear side of a display panel 60 and has two side skirts 52 each extending from each one of two sides thereof so as to define a receiving passage 522 between each of the side skirts 52 and an outer surface of the base member 50. The base member 50 has a flexible plate 54 integrally extending therefrom which has a protrusion 542 extending therefrom.

A connecting member 10 has a roof 11 and two side walls 13 each extending from each one of two sides of the roof 11. Two rear walls 15 each are connected to the roof 11 and the side wall 13 corresponding thereto to form a corner portion and a recess 16 is defined between the two rear walls 15. Each of the side walls 13 has a flange 181 extending laterally therefrom for insertion into the receiving passage 522 corresponding thereto and a top board 18 extending from a top of the roof 11. The top board 18 has a transverse slot 182 defined therein such that when the flanges 181 are inserted into the receiving passages 522, the protrusion 542 of the flexible plate 54 is received into the transverse slot 182. The roof 11 has a notch 110 defined in an inner surface thereof and each of the rear walls 15 has a hole 151 defined therein. The two side walls 13 have a first half tube 12 transversely formed on a respective lower end thereof, the first half tube 12 having a first engaging portion, such as a rod 14 formed to a lower edge thereof.

A second half tube 20 has an upper part formed on an upper edge thereof and a second engaging portion, such as two hook elements 24 formed to a lower edge thereof for an engagement with the rod 14. The upper part comprises an extending plate 28 extending inclinedly from the upper edge of the second half tube 20 and two side parts 26 extending from the upper edge of the half tube 20. The extending plate 28 has a hook 284 formed thereto so as to engage with the notch 110 when inserting into the connecting member 10 from the recess 16 and each of the side parts 26 has a tubular element 262 extending toward the rear wall 15 corresponding thereto such that the upper part is fixedly connected to the rear wall 15 corresponding thereto by bolts 263 threadedly extending through the tubular element 262 and the hole 151.

The first half tube 12 and the second half tube 20 each have a plurality of arcuate ribs 122/222 extending radially and inwardly from an inner surface thereof so as to define a groove 12a/22 between the pair of adjacent arcuate ribs 122/222. Two C-shaped clamp rings 30 are each received between two adjacent arcuate ribs 122/222, wherein each of the clamp rings 30 has a lip 34 extending laterally from both sides thereof, a diameter enclosed by the lip 34 is smaller than that of the clamp ring 30 such that an outer periphery of each of the clamp rings 30 is received in the groove 12a/22 and the lip 34 contacts an inner surface of each of the adjacent arcuate ribs 122/222.

Figure 4:
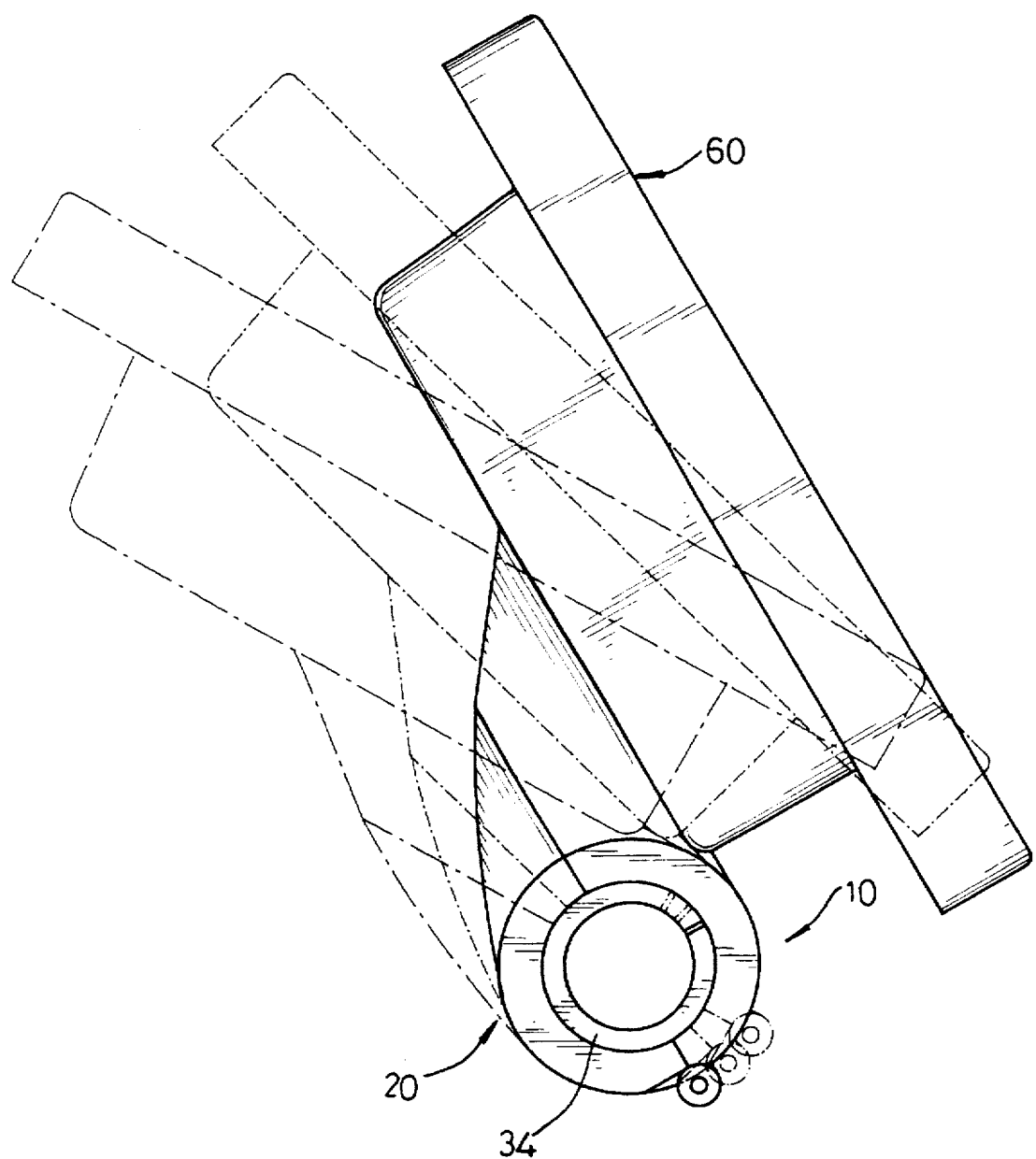
FIG. 4 is an illustrative view to show the display panel is adjusted about an axis of a frame.

Accordingly, a stanchin tip of a frame of an exercise machine (not shown) can be received in the two clamp rings 30 and is securely received in the clamp rings 30 by threading the bolts 263 into the tubular elements 262 and holes 151. The frame is allowed to be rotated (see FIG. 4) about an axis of the frame by loosening the bolts 263.

Figure 5:
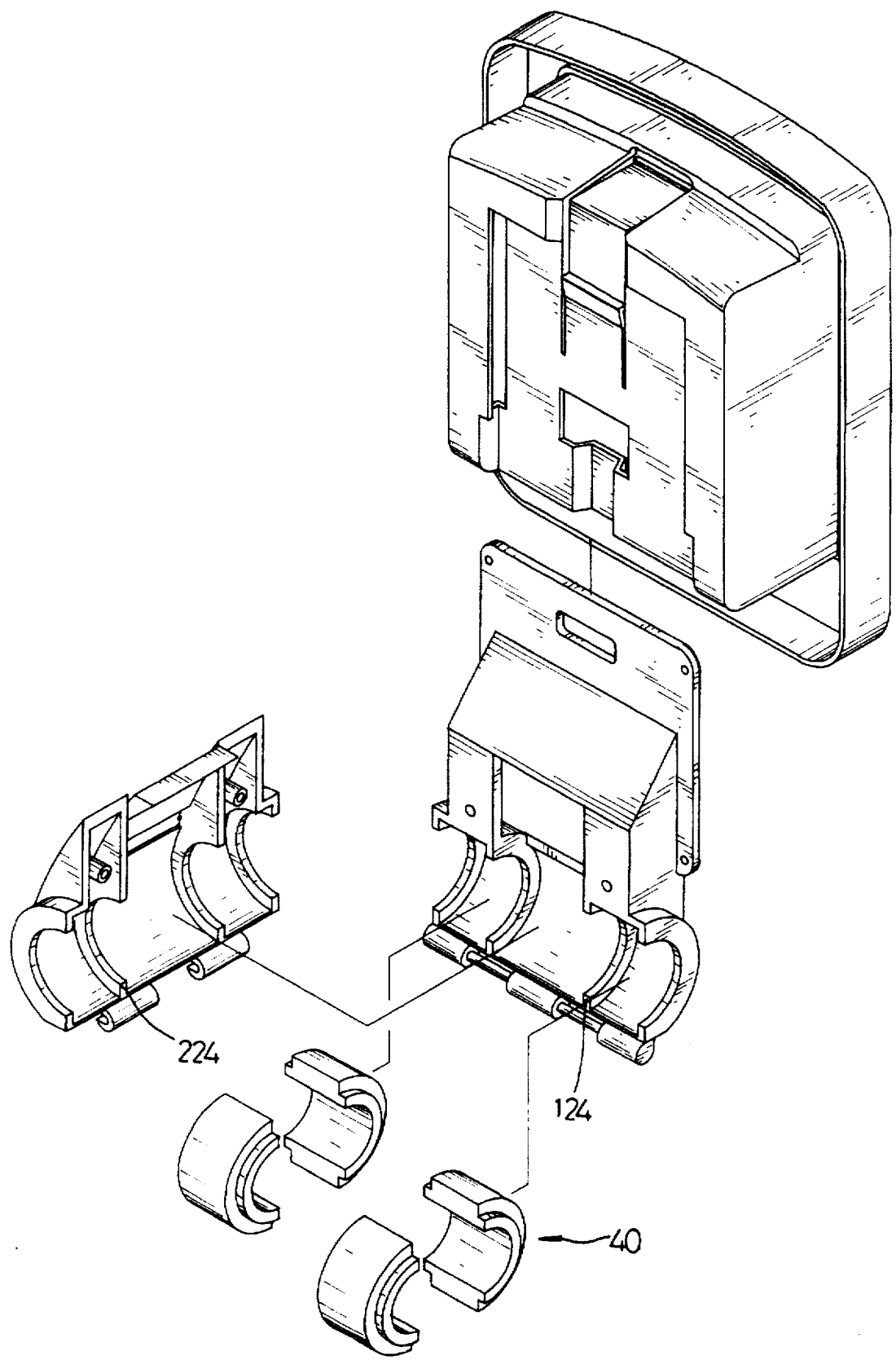
FIG. 5 is an exploded view of another embodiment of the adjusting device in accordance with the present invention.

FIG. 5 shows another embodiment of the present invention wherein a distance between two adjacent arcuate ribs 124/224 of the first half tube 12 and the second half tube 20 is larger than a width of the groove 12a/22 described above. The clamp ring 40 is wider than that of the clamp ring 30 described above in order to fit between the adjacent arcuate ribs 124/224.

Although the invention has been explained in relation to its preferred embodiment, it is to be understood that many other possible modifications and variations can be made without departing from the spirit and scope of the invention as hereinafter claimed.

What is claimed is:

1. An adjusting device for a display panel, comprising:

a base member connectable to a rear side of said display panel, said base member having two side skirts each extending from each one of two sides thereof so as to define a receiving passage between each of said side skirts and an outer surface of said base member;

a connecting member having a roof and two side walls each extending from each one of two sides of said roof, two rear walls each connected to said roof and said side wall corresponding thereto so as to define a recess between said two rear walls, each of said side walls having a flange extending laterally therefrom for insertion into said receiving passage corresponding thereto and a top board extending from a top of said roof, said roof having a notch defined in an inner surface thereof, said two side walls having a first half tube transversely connected to a respective lower end thereof, said first half tube having a first engaging portion formed to a lower edge thereof, and a second half tube having an upper part connected to an upper edge thereof and a second engaging portion formed to a lower edge thereof for an engagement with said first engaging portion, said upper part comprising an extending plate extending inclinedly from said upper edge of said second half tube and two side parts extending from said upper edge of said half tube, said extending plate having a hook formed thereto so as to engage with said notch and each of said side parts fixedly connected to said rear wall corresponding thereto by bolts.

2. The adjusting device as claimed in claim 1 wherein said first half tube and said second half tube each have a plurality of arcuate ribs extending radially and inwardly from an inner surface thereof.

3. The adjusting device as claimed in claim 1 wherein said top board has a transverse slot defined therein and said base member has a flexible plate integrally extending therefrom which has a protrusion extending therefrom for being received in said transverse slot.

4. The adjusting device as claimed in claim 2 wherein at least one clamp ring is received between two adjacent ribs of said arcuate ribs.

5. The adjusting device as claimed in claim 4 wherein said clamp ring is a C-shaped element.

6. The adjusting device as claimed in claim 4 wherein said clamp ring has a lip extending laterally from both sides thereof so as to contact an inner surface of each of said two adjacent arcuate ribs.

7. The adjusting device as claimed in claim 1 wherein said first engaging portion is a rod and the second engaging portion is two hook elements.

* * * * *